United States Patent
Duvendack et al.

(10) Patent No.: US 10,933,903 B2
(45) Date of Patent: Mar. 2, 2021

(54) RACK ADJUSTER PLUG ASSEMBLY FOR VEHICLE

(71) Applicant: STEERING SOLUTIONS IP HOLDING CORPORATION, Saginaw, MI (US)

(72) Inventors: Paul T. Duvendack, Saginaw, MI (US); Troy Kinne, Midland, MI (US); George Arit, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/049,146

(22) Filed: Jul. 30, 2018

(65) Prior Publication Data
US 2019/0039638 A1 Feb. 7, 2019

Related U.S. Application Data

(60) Provisional application No. 62/540,339, filed on Aug. 2, 2017.

(51) Int. Cl.
*B62D 3/12* (2006.01)
*F16H 55/28* (2006.01)
*F16H 19/04* (2006.01)

(52) U.S. Cl.
CPC ............ *B62D 3/123* (2013.01); *F16H 19/04* (2013.01); *F16H 55/283* (2013.01)

(58) Field of Classification Search
CPC ................ B62D 3/123; F16H 55/283
See application file for complete search history.

(56) References Cited

U.S. PATENT DOCUMENTS

| 3,778,539 | A  | * | 12/1973 | Baier    | F16B 43/001  |
|           |    |   |         |          | 174/152 R    |
| 7,487,984 | B1 | * | 2/2009  | Lemont, Jr. | B62D 3/123 |
|           |    |   |         |          | 280/93.514   |
| 2002/0024190 | A1 | * | 2/2002 | Tanaka   | B62D 3/123  |
|           |    |   |         |          | 280/93.514   |
| 2003/0115980 | A1 | * | 6/2003 | Sickert  | F16H 55/283 |
|           |    |   |         |          | 74/409       |
| 2007/0209464 | A1 | * | 9/2007 | Roline   | B62D 3/123  |
|           |    |   |         |          | 74/422       |
| 2008/0034910 | A1 | * | 2/2008 | Roline   | B62D 3/123  |
|           |    |   |         |          | 74/422       |
| 2009/0223314 | A1 | * | 9/2009 | Eickholt | B62D 3/123  |
|           |    |   |         |          | 74/422       |

(Continued)

FOREIGN PATENT DOCUMENTS

| CN | 202728323 U | 2/2013 |
| CN | 202896663 U | 4/2013 |
| WO | 0168434 A2  | 9/2001 |

OTHER PUBLICATIONS

English translation of First Office Action regarding related CN App. No. 201810868858.8; dated Aug. 3, 2020.

*Primary Examiner* — William Kelleher
*Assistant Examiner* — Gregory T Prather
(74) *Attorney, Agent, or Firm* — Dickinson Wright PLLC

(57) ABSTRACT

A rack adjuster plug assembly for a steering system of a vehicle includes an outer bearing seat coupled to a rack housing and in abutment with a rack bearing. Also included is an inner spring seat disposed within a central aperture of the outer bearing seat. Further included is a spring disposed between the rack bearing and the inner spring seat.

16 Claims, 2 Drawing Sheets

(56) References Cited

U.S. PATENT DOCUMENTS

| | | | |
|---|---|---|---|
| 2013/0036845 A1* | 2/2013 | Amada | B62D 3/123 74/30 |
| 2013/0068048 A1* | 3/2013 | Bareis | B62D 3/123 74/55 |
| 2013/0319141 A1* | 12/2013 | Yamamoto | B62D 3/123 74/30 |
| 2014/0020493 A1* | 1/2014 | Nakamura | F16H 55/283 74/422 |
| 2014/0109702 A1* | 4/2014 | Kometani | B62D 5/0421 74/30 |
| 2014/0338485 A1* | 11/2014 | Taenaka | B62D 3/123 74/422 |
| 2014/0366660 A1* | 12/2014 | Speidel | B62D 3/123 74/30 |
| 2015/0053030 A1* | 2/2015 | Kim | B62D 3/123 74/409 |
| 2015/0166098 A1* | 6/2015 | Lingemann | B62D 3/123 74/409 |
| 2015/0191197 A1* | 7/2015 | Lucchi | B62D 3/123 74/409 |
| 2015/0226315 A1* | 8/2015 | Iizuka | B62D 3/126 74/409 |
| 2015/0307122 A1* | 10/2015 | Kim | B62D 3/123 74/409 |
| 2016/0031474 A1* | 2/2016 | Srinivasan | C22F 1/047 74/409 |
| 2016/0223066 A1* | 8/2016 | Imamura | F16H 55/283 |
| 2017/0037952 A1* | 2/2017 | Kikuchi | F16H 55/28 |
| 2017/0050666 A1* | 2/2017 | Kawakubo | B62D 3/126 |
| 2017/0267277 A1* | 9/2017 | Ohashi | B62D 3/123 |
| 2018/0043924 A1* | 2/2018 | Okamoto | B62D 3/123 |
| 2018/0201304 A1* | 7/2018 | Miyoshi | B62D 3/12 |
| 2018/0222525 A1* | 8/2018 | Kim | F16H 55/28 |
| 2018/0257697 A1* | 9/2018 | Son | B62D 3/123 |
| 2019/0016368 A1* | 1/2019 | Djie | F16H 55/283 |
| 2019/0063581 A1* | 2/2019 | Brown | F16H 55/283 |
| 2019/0135329 A1* | 5/2019 | Feldpausch | B62D 3/123 |
| 2019/0185051 A1* | 6/2019 | Augustine | B62D 3/12 |
| 2019/0193773 A1* | 6/2019 | Kim | B62D 3/123 74/409 |

\* cited by examiner

RACK ADJUSTER PLUG ASSEMBLY FOR VEHICLE

CROSS REFERENCE TO RELATED APPLICATION

This patent application claims the benefit of priority to U.S. Provisional Patent Application Ser. No. 62/540,339, filed Aug. 2, 2017, which is incorporated herein by reference in its entirety

BACKGROUND

The following description relates to steering Rack and Pinion steering assemblies and, more particularly, to a rack adjuster plug assembly for a vehicle.

In an ongoing effort to reduce friction between a rack bar and a rack bearing of a steering assembly, it has been determined that changing an adjuster spring is one solution to reduce friction. This allows several springs of differing spring constants to be chosen from. However, in doing so, there is a concern that a spring too light can cause rattle, and a spring too stiff can cause high friction.

SUMMARY OF THE INVENTION

According to an aspect of the disclosure, a rack adjuster plug assembly for a steering system of a vehicle includes an outer bearing seat coupled to a rack housing and in abutment with a rack bearing. Also included is an inner spring seat disposed within a central aperture of the outer bearing seat. Further included is a spring disposed between the rack bearing and the inner spring seat.

According to another aspect of the disclosure, a rack and pinion steering assembly includes a rack. Also included is a rack housing. Further included is a rack bearing in abutment with the rack. Yet further included is an outer bearing seat threaded to the rack housing and in abutment with a rack bearing. Also included is an inner spring seat disposed within a central aperture of the outer bearing seat. Further included is a spring disposed between the rack bearing and the inner spring seat. Yet further included is a seal plug disposed within a central aperture of the inner spring seat, the seal plug threaded to the inner spring seat.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a rack adjuster plug assembly is illustrated and generally referenced with numeral 10.

Figure 1:
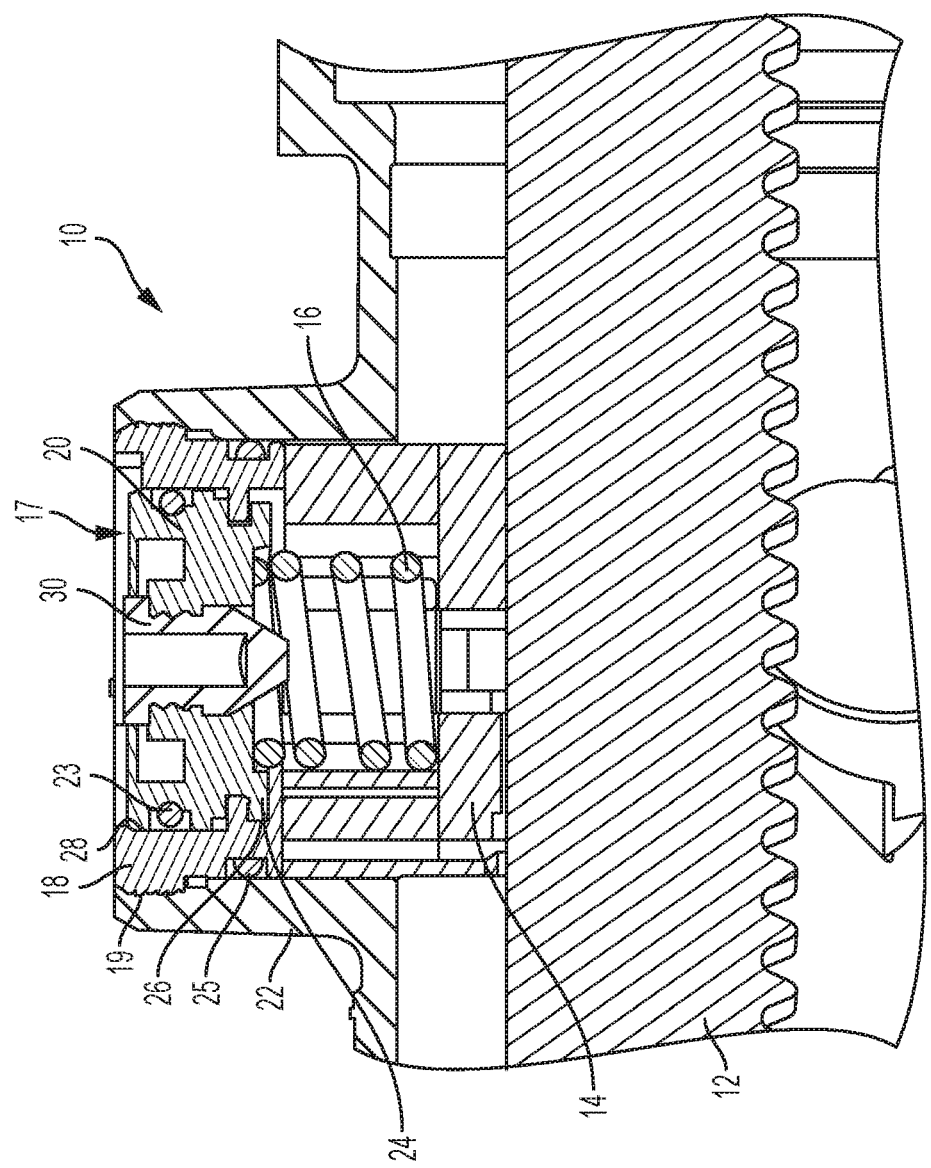
FIG. 1 is a sectional view of a rack adjuster plug assembly.
Figure 3:
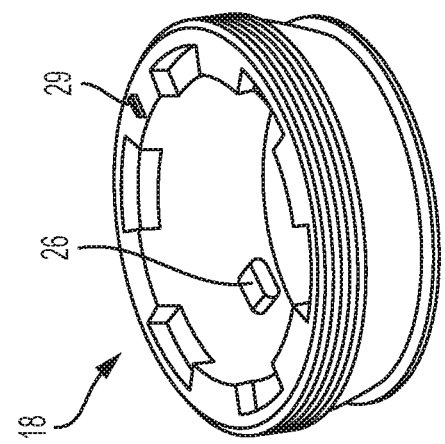
FIG. 3 is a perspective view of an outer bearing seat of the rack adjuster plug assembly.

Referring to FIG. 1, a rack 12 associated with a steering system of a vehicle is illustrated. The rack 12 plays a role in steering operations of road wheels (not shown) of a vehicle. A rack bearing 14 is located proximate the rack 12, but excessive friction between the components is not desired. To reduce such friction, an adjuster spring 16 is utilized. The rack adjuster plug assembly 10 described herein allows removal and replacement of the spring 16 without disrupting the rack clearance that is set with an outer bearing seat 18. The outer bearing seat 18 is illustrated in additional detail in FIG. 3.

Figure 2:
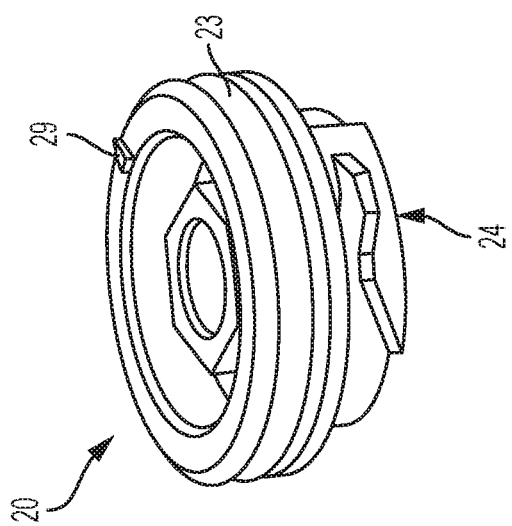
FIG. 2 is a perspective view of an inner spring seat of the rack adjuster plug assembly.

As shown in FIG. 1, the outer bearing seat 18 is in abutment with the rack bearing 14 and includes a central aperture 17 for receiving an inner spring seat 20 therein, the inner spring seat 20 shown in additional detail in FIG. 2. The outer bearing seat 18 includes threading 19 along a portion of the radially exterior surface of the outer bearing seat. The threading allows the outer bearing seat to be threaded to a rack housing 22 to fix the position of the outer bearing seat 18, relative to the rack 12 and rack bearing 14.

The inner spring seat 20 is positioned within the central aperture 17 of the outer bearing seat 18, as noted above, and includes a locating and locking feature 24 that engages a corresponding feature 26 on a wall 28 of the outer bearing seat 18 that defines the central aperture 17. The locating and locking feature 24 and the corresponding feature 26 may be any combination of protrusion(s) and groove(s) to facilitate proper location and locking during assembly. As shown in the illustrated example of FIG. 2, the locating and locking feature 24, as well as the corresponding feature, may include various segments that are angled relative to each other to facilitate installation and positive securement of the inner spring seat 20 to the outer bearing seat 18. The twist lock feature provides multiple steps of assembly error proofing and confidence in proper engagement.

Figure 4:
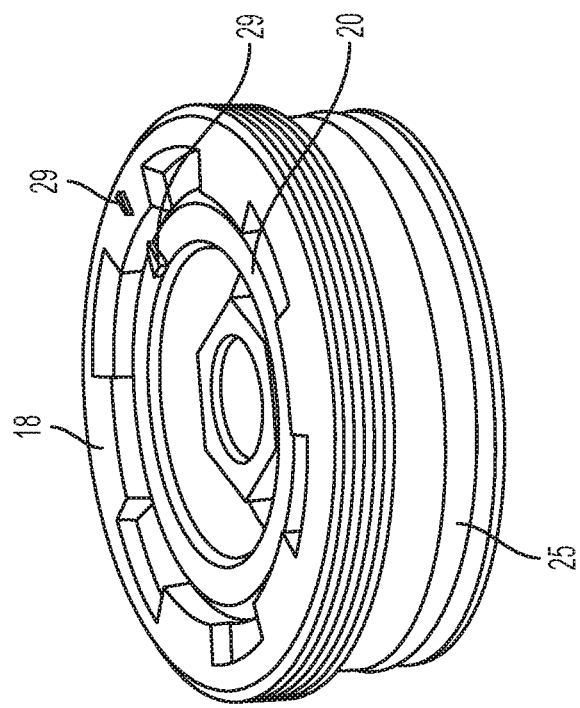
FIG. 4 is a perspective view of the inner spring seat and the outer bearing seat in an assembled condition.

To further assist with installation, as shown in FIGS. 2 and 4, alignment keys 29 may be provided to visually illustrate proper alignment. In the illustrated example, the inner spring seat 20 includes one or more alignment keys that are to be matched up with one or more corresponding alignment keys included on the outer bearing seat 18 (FIG. 4).

The inner spring seat 20 is in abutment with the spring 16 to fix the spring 16 between the rack bearing 14 and the inner spring seat 20. A sealing plug 30 is disposed within a central opening 31 of the inner spring seat 20 and threaded thereto. The sealing plug 30 seals against water ingress into the rack housing bearing bore.

The inner spring seat 20 includes an o-ring seal 23 (FIG. 2) in some embodiments for additional sealing. Additionally, or alternatively, the outer bearing seat 18 includes an integrated o-ring seal 25 (FIG. 3) for additional sealing in some embodiments. The outer bearing seat 18 is formed of a plastic material in some embodiments.

The rack adjuster plug assembly 10 provides an assembly process that sets rack clearance. Back drive or turning torque stations which follow the setting of the clearance would have a rework loop as part of the process so that the spring 16 may be changed to achieve the proper back drive force. The embodiments described herein allow for the adjustment of back drive or turning torque without the need to re-set rack clearance. The assembly 10 includes inexpensive molded components with integral sealing.

In operation, the spring 16 may be removed and replaced by removing the inner spring seat 20. Beneficially, the outer bearing seat 18 does not require removal during such a process, thereby retaining the rack clearance, as described above.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rack adjuster plug assembly for a steering system of a vehicle comprising:
    an outer bearing seat coupled to a rack housing and in abutment with a rack bearing;
    an inner spring seat disposed within a central aperture of the outer bearing seat;
    a locating and locking assembly fixing the position and engagement between the inner spring seat and the outer bearing seat, the locating and locking assembly including a protrusion having a plurality of planar segments that are angled relative to each other;
    a pair of alignment keys, wherein one of the alignment keys is on the outer bearing seat and one of the alignment keys is on the inner spring seat; and
    a spring disposed between the rack bearing and the inner spring seat.

2. The rack adjuster plug assembly of claim 1, wherein the locating and locking assembly comprises:
    the protrusion extending radially outwardly from the inner spring seat; and
    a groove defined within an aperture wall of the outer bearing seat.

3. The rack adjuster plug assembly of claim 1, wherein the locating and locking assembly comprises:
    a groove defined by the inner spring seat; and
    the protrusion extending radially inwardly from the aperture wall of the outer bearing seat.

4. The rack adjuster plug assembly of claim 1, wherein the spring is repeatedly removable, wherein removal and replacement of the spring does not require resetting a clearance of the rack.

5. The rack adjuster plug assembly of claim 1, further comprising an o ring seal fixed to an outer surface of the inner spring seat.

6. The rack adjuster plug assembly of claim 1, further comprising an o ring seal fixed to an outer surface of the outer bearing seat.

7. The rack adjuster plug assembly of claim 1, further comprising a seal plug disposed within a central aperture of the inner spring seat.

8. The rack adjuster plug assembly of claim 7, wherein the seal plug is threaded to the inner spring seat.

9. The rack adjuster plug assembly of claim 1, wherein the outer bearing seat is threaded to the rack housing.

10. The rack adjuster plug assembly of claim 1, wherein the outer bearing seat is formed of plastic.

11. A rack and pinion steering assembly comprising:
    a rack;
    a rack housing;
    a rack bearing in abutment with the rack;
    an outer bearing seat threaded to the rack housing and in abutment with a rack bearing;
    an inner spring seat disposed within a central aperture of the outer bearing seat;
    a spring disposed between the rack bearing and the inner spring seat;
    a seal plug disposed within a central aperture of the inner spring seat, the seal plug threaded to the inner spring seat; and
    a locating and locking assembly fixing the position and engagement between the inner spring seat and the outer bearing seat, wherein the locating and locking assembly comprises a single protrusion extending radially inwardly from an aperture wall of the outer bearing seat, the single protrusion having a plurality of planar segments that are angled relative to each other.

12. The rack and pinion steering assembly of claim 11, wherein the locating and locking assembly further comprises:
    a groove defined by the inner spring seat.

13. The rack and pinion steering assembly of claim 11, wherein the spring is repeatedly removable, wherein removal and replacement of the spring does not require resetting a clearance of the rack.

14. The rack and pinion steering assembly of claim 11, further comprising an o ring seal fixed to an outer surface of the inner spring seat.

15. The rack and pinion steering assembly of claim 11, further comprising an o ring seal fixed to an outer surface of the outer bearing seat.

16. The rack and pinion steering assembly of claim 11, wherein the outer bearing seat is formed of plastic.

\* \* \* \* \*